(12) United States Patent
Zhang et al.

(10) Patent No.: US 11,901,951 B2
(45) Date of Patent: Feb. 13, 2024

(54) DISTORTER COEFFICIENT UPDATING APPARATUS, METHOD AND DIGITAL PREDISTORTION APPARATUS

(71) Applicant: FUJITSU LIMITED, Kawasaki (JP)

(72) Inventors: Ke Zhang, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/834,036

(22) Filed: Jun. 7, 2022

(65) Prior Publication Data
US 2023/0010592 A1 Jan. 12, 2023

(30) Foreign Application Priority Data
Jul. 7, 2021 (CN) .......................... 202110768985.2

(51) Int. Cl.
*H04B 10/60* (2013.01)
*H04B 10/58* (2013.01)

(52) U.S. Cl.
CPC ............. *H04B 10/60* (2013.01); *H04B 10/58* (2013.01)

(58) Field of Classification Search
None
See application file for complete search history.

(56) References Cited

U.S. PATENT DOCUMENTS

2004/0213578 A1* 10/2004 Takahara ........... H04B 10/2513
398/147
2006/0049870 A1* 3/2006 Hellberg ............... H03F 1/3294
330/136
2008/0298520 A1 12/2008 Hsu et al.
(Continued)

FOREIGN PATENT DOCUMENTS

| CN | 101039152 A | 9/2007 |
|----|-------------|--------|
| CN | 102624338 A | 8/2012 |
| CN | 109617841 A | 4/2019 |

OTHER PUBLICATIONS

X. Bin Guo, et al. "A Novel Predistorter Model for Digital Predistortion of RF Power Amplifiers", The 2012 International Workshop on Microwave and Milimeter Wave Circuits and System Technology.
(Continued)

*Primary Examiner* — Darren E Wolf
(74) *Attorney, Agent, or Firm* — STAAS & HALSEY LLP (57) ABSTRACT

A distorter coefficient updating apparatus, a distorter coefficient updating method, and a digital predistortion apparatus. The distorter coefficient updating apparatus is configured at an optical receiver side, and comprises a processor configured to: perform re-distortion processing on a signal after decision according to a first distorter coefficient to generate a first reference signal; and calculate a second distorter coefficient according to the first reference signal and a signal before decision, or according to the first reference signal, the signal after decision, and the signal before decision The second distorter coefficient is fed back to the processor as the first distorter coefficient of the processor in a next update, and the second distorter coefficient is fed back to a predistorter on an optical transmitter side as a predistortion coefficient for the predistorter to perform a predistortion processing on a signal input to the predistorter.

17 Claims, 7 Drawing Sheets

(56) References Cited

U.S. PATENT DOCUMENTS

2012/0263456 A1* 10/2012 Tanaka ............... H04B 10/5055
398/25
2014/0086356 A1* 3/2014 Azadet ..................... H03F 3/24
375/295
2015/0326190 A1* 11/2015 Gustavsson ............. H03F 3/195
330/250

OTHER PUBLICATIONS

Fadhel M. Ghannouchi, et al., "Behavioral modeling and predistortion." Digital Object Identifier 10.1109/MMM.2009.934516, IEEE Microwave magazine, 1527-3342/09$26.00 ©2009 IEEE, Dec. 2009: 52.64.

Pablo Wilke Berenguer, et al. "Nonlinear digital pre-distortion of transmitter components." DOI 10.1109/JLT.2015.2510962, Journal of lightwave technology 34.8 (2015): 1739-1745.

Ginni Khanna, et al. "Adaptive transmitter pre-distortion using feedback from the far-end receiver." IEEE Photonics Technology Letters, vol. 30, No. 3, Feb. 1, 2018, 223-226.

Dennis R. Morgan, et al. "A Generalized Memory Polynomial Model for Digital Predistortion of RF Power Amplifiers." IEEE Transactions on signal processing, vol. 54, No. 10, Oct. 2006: 3852-3860.

\* cited by examiner

$i^{th}$ cascade

1101 power normalization is performed on the first reference signal to generate the second reference signal

Fig. 11 begin 1201
whether a prescribed condition is satisfied

N

Y 1202
a first calculation unit performs re-distortion processing on a signal after decision according to a first distorter coefficient to generate a first reference signal 1203
a second calculation unit calculates a second distorter coefficient according to the first reference signal and a signal before decision, or according to the first reference signal, the signal after decision, and the signal before decision 1204
the second distorter coefficient is fed back to the first calculation unit as the first distorter coefficient of the first calculation unit in a next update, and the second distorter coefficient is fed back to a predistorter on an optical transmitter side as a predistortion coefficient for the predistorter to perform predistortion processing on a signal input to the predistorter

DISTORTER COEFFICIENT UPDATING APPARATUS, METHOD AND DIGITAL PREDISTORTION APPARATUS

CROSS-REFERENCE TO RELATED APPLICATIONS

This application is based on and hereby claims priority to Chinese Application No. 202110768985.2, filed Jul. 7, 2021, in the State Intellectual Property Office of China, the disclosure of which is incorporated herein by reference.

TECHNICAL FIELD

This disclosure relates to the field of communication technologies, in particular to a distorter coefficient updating apparatus, a distorter coefficient updating method and a digital predistortion apparatus.

BACKGROUND

In an optical communication system, signals with high baud rate and high-order modulation format may effectively improve a transmission capacity of a single channel in a wavelength division multiplexing (WDM) system. However, the signals are susceptible to inter-symbol interference (ISI) caused by nonlinearity of electrical and optical apparatuses such as a digital-to-analog converter, a drive amplifier, and an optical modulator in an optical transmitter, thereby resulting in reduced transmission performance.

Digital predistortion is a typical technical means to reduce the cost introduced by the nonlinearity of the apparatuses.

It should be noted that the above description of the background art is merely provided for clear and complete explanation of this disclosure and for easy understanding by those skilled in the art. And it should not be understood that the above technical solutions are known to those skilled in the art as it is described in the background art of this disclosure.

SUMMARY

According to a first aspect of the embodiments of this disclosure, there is provided a distorter coefficient updating apparatus, wherein the apparatus is configured at an optical receiver side, and comprises: a processor configured to perform re-distortion processing on a signal after decision according to a first distorter coefficient to generate a first reference signal; and calculate a second distorter coefficient according to the first reference signal and a signal before decision, or according to the first reference signal, the signal after decision, and the signal before decision, and feed the second distorter coefficient back to the first calculation unit as the first distorter coefficient of the first calculation unit in a next update, and feed the second distorter coefficient back to a predistorter on an optical transmitter side as a predistortion coefficient for the predistorter to perform predistortion processing on a signal input to the predistorter.

According to a second aspect of the embodiments of this disclosure, there is provided a distorter coefficient updating method, wherein the method is applied at an optical receiver side, and comprises a processor: performing re-distortion processing on a signal after decision according to a first distorter coefficient to generate a first reference signal; and calculating a second distorter coefficient according to the first reference signal and a signal before decision, or according to the first reference signal, the signal after decision, and the signal before decision, and feeding the second distorter coefficient back to the first calculation unit as the first distorter coefficient of the first calculation unit in a next update, and feeding the second distorter coefficient back to a predistorter on an optical transmitter side as a predistortion coefficient for the predistorter to perform predistortion processing on the signal input to the predistorter.

According to a third aspect of the embodiments of this disclosure, there is provided a digital predistortion apparatus, wherein the digital predistortion apparatus comprises: a predistorter in an optical transmitter, configured to perform real-time predistortion processing on a signal input to the predistorter according to a predistortion coefficient; a decider in an optical receiver, configured to decide an input signal before decision to generate a signal after decision; and a distorter coefficient updating apparatus at the optical receiver side, comprising a processor configured to: perform re-distortion processing on the signal after decision according to a first distorter coefficient to generate a first reference signal; and calculate a second distorter coefficient according to the first reference signal and the signal before decision, or according to the first reference signal, the signal after decision, and the signal before decision, and feed the second distorter coefficient back to the first calculation unit as the first distorter coefficient of the first calculation unit in a next update, and feed the second distorter coefficient back to the predistorter as a predistortion coefficient for the predistorter to perform predistortion processing on the signal input to the predistorter.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features described in one drawing or embodiment of this disclosure may be combined with those shown in one or more other drawings or embodiments. Furthermore, similar reference signs in the drawings refer to corresponding parts throughout a plurality of drawings and may be used to designate corresponding parts used in more than one embodiment.

The included drawings are used to provide a further understanding of the embodiments of this disclosure, which form a part of the description, illustrate the embodiments of this disclosure, and explain the principles of this disclosure together with the text description. Obviously, the drawings in the following description are only some embodiments of this disclosure. For those with ordinary skills in the art, other drawings can be obtained according to these drawings without paying creative efforts.

DETAILED DESCRIPTION OF THE DISCLOSURE

These and further aspects and features of the present disclosure will be apparent with reference to the following description and attached drawings. In the description and drawings, specific embodiments of this disclosure are disclosed in detail, which are indicative of some embodiments in which the principles of this disclosure can be employed. It should be understood that this disclosure is not limited to the embodiments described here, on the contrary, this disclosure includes all modifications, variations and equivalents falling within the scope of the appended claims.

In the embodiments of this disclosure, terms "first", "second", etc., are used to differentiate different elements with respect to names, and do not indicate spatial arrangement or temporal order of these elements, and these elements should not be limited by these terms. Term "and/or" includes any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be broadly understood as "a kind of" or "a type of", but should not defined as the meaning of "one". In addition, the term "the" should be understood as including both a single form and a plural form, except specified otherwise. Furthermore, the term "according to" should be understood as "at least partially according to . . . " and the term "based on" should be understood as "at least partially based on", except specified otherwise.

In the embodiments of this disclosure, calculation of digital distorter coefficients in an optical fiber communication system is used as an example for description. However, this example is only exemplary, and is not intended to limit this disclosure. The embodiments of this disclosure are applicable to all communication systems with nonlinear distortion, and are not limited to the optical fiber communication system.

It was found by the inventors that there are some problems in the digital predistortion method of the prior art, such as performance degradation over time, large delay, and high consumption of hardware resources. For example, nonlinear predistortion is achieved by modeling inverse processes of transfer function of optical transmitter components under offline conditions, where models of the components may be obtained by direct measurement. However, nonlinear characteristics of optical transmitter components change over time due to the effects of temperature and apparatus aging. Consequently, the performance of such a predistortion method based on static apparatus characterization may be degraded significantly over time. For another example, nonlinearity of the optical transmitter is dynamically precompensated at the transmitter side based on a feedback from a remote receiver side. Since signal sample information needs to be transmitted from the remote receiver to the transmitter in real time, feeding back these signal samples not only occupies a large number of channel resources but also introduces large delay, and processing these signal sample data at the transmitter also requires more hardware resources.

In order to solve at least one of the above problems, the embodiments of this disclosure provide a distorter coefficient updating apparatus, a distorter coefficient updating method and a digital predistortion apparatus.

An advantage of the embodiments of this disclosure exists in that the update of digital distorter coefficients is carried out at the optical receiver side without knowing specific data information transmitted by the optical transmitter. In addition, it only needs to feed back the predistorter coefficients with a very small amount of information from the optical receiver to the optical transmitter, which occupies very few channel resources.

Embodiments of this disclosure shall be described below with reference to the accompanying drawings.

First Aspect of the Embodiments

Figure 1:
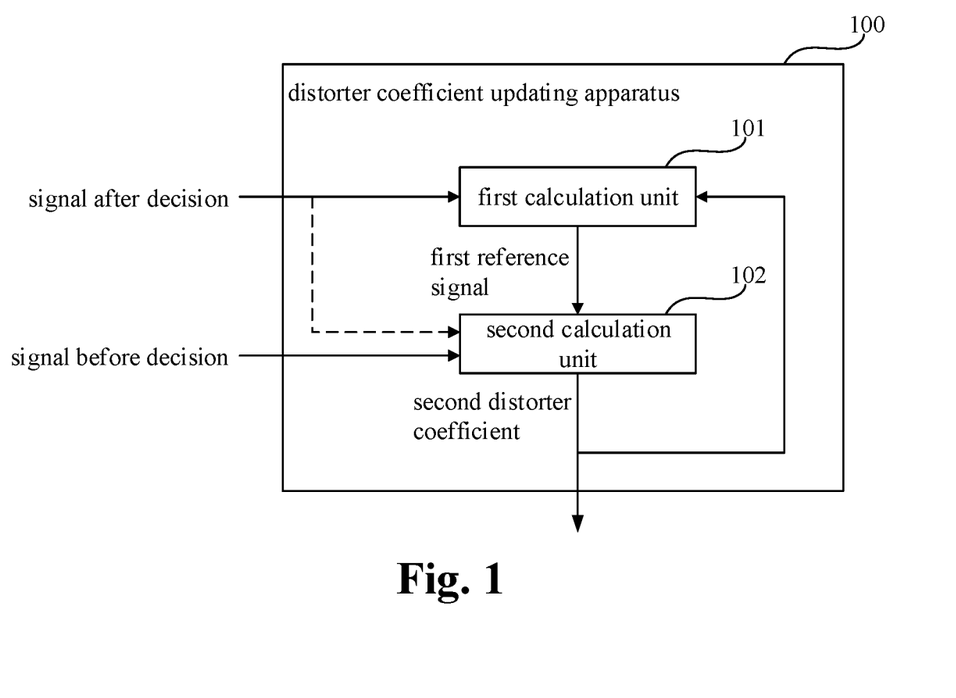
FIG. 1 is a schematic diagram of a distorter coefficient updating apparatus of the first aspect of the embodiments.

This embodiment provides a distorter coefficient updating apparatus. FIG. 1 is a schematic diagram of a distorter coefficient updating apparatus 100. The distorter coefficient updating apparatus 100 is configured at optical receiver side. As shown in FIG. 1, the distorter coefficient updating apparatus 100 includes s: a first calculation unit 101 and a second calculation unit 102. The first calculation unit 101 performs re-distortion processing on a signal after decision according to a first distorter coefficient to generate a first reference signal. The second calculation unit 102 calculates a second distorter coefficient according to the first reference signal and the signal before decision, or according to the first reference signal, the signal after decision, and a signal before decision, and feeds the second distorter coefficient back to the first calculation unit 101 as the first distorter coefficient of the first calculation unit 101 in a next update, and feeds the second distorter coefficient back to a predistorter on an optical transmitter side as a predistortion coefficient for the predistorter to perform predistortion processing on a signal input to the predistorter.

According to the distorter coefficient updating apparatus 100 in this embodiment, the update of digital distorter coefficients is carried out at the optical receiver side without knowing specific data information transmitted by the optical transmitter. In addition, it only needs to feed back the predistorter coefficients (second distorter coefficient) with a very small amount of information from the optical receiver to the optical transmitter, which occupies very few channel resources.

In at least one embodiment, the signal before decision may be a signal obtained based on an existing optical receiver structure and digital signal processing technology. The signal after decision may be a signal obtained after the optical receiver performs decision processing on the signal before decision. The optical receiver may be a coherent receiver or an incoherent receiver. The decision processing may be a hard decision or a soft decision.

In at least one embodiment, the decision processing of the optical receiver may be performed after equalization processing, and an average power of the signal before decision has been adaptively normalized to be around a reference value. The distorter coefficient updating apparatus 100 may calculate distorter coefficients using the signal before decision.

However, this disclosure is not limited to this. The distorter coefficient updating apparatus 100 may further include a normalization unit (not shown in drawings), and the normalization unit may perform power normalization on the input signal before decision. The signal before decision after power normalization may be used to calculate the distorter coefficients. For example, in a case of particularly large noise within the signal, the power of the signal before decision input to the distorter coefficient updating apparatus 100 may deviate from the reference value. By normalizing the power of the signal before decision, the distorter coefficient updating apparatus 100 may further ensure the accuracy of the distorter coefficient calculation and further improve the predistortion performance.

In at least one embodiment, the first calculation unit 101 is configured at the optical receiver side, and its structure is the same as that of the predistorter on the optical transmitter side. For example, the first calculation unit 101 at the optical receiver side performs digital re-distortion processing on the signal after decision, the predistorter on the optical transmitter side performs real-time predistortion processing on a data signal to be transmitted, and the first calculation unit 101 and the predistorter use the same structure and distorter coefficients to perform their respective processing.

In some embodiments, the distorter model used by the first calculation unit 101 when performing re-distortion processing is the same as the distorter model used by the predistorter when performing predistortion processing. The distorter models used by the first calculation unit 101 and the predistorter may be Volterra series, or a memory polynomial, or a Winner model, or a Hammerstein model, or a multi-stage-parallel nonlinear (M-P) model, which is not specifically limited by this disclosure.

In some embodiments, the Volterra series may be expressed in the form of Formula (1):

$$y(n)=\Sigma_{k=1}^{K}[\Sigma_{m_1=1}^{M_k-1}\Sigma_{m_2=0}^{M_k-1}\ldots\Sigma_{m_k=0}^{M_k-1}h_k(m_1,m_2,\ldots,m_k)\Pi_{l=1}^{k}x(n-m_l)] \quad (1)$$

where K is an order of the Volterra series, $M_k$ is a memory length of a $k^{th}$ order coefficient of the Volterra series, $1 \le k \le K$, $h_k(m_1, m_2, \ldots, m_k)$ is a Volterra kernel coefficient, x(n) is a signal input to the Volterra series, y(n) is a signal processed by the Volterra series.

In at least one embodiment, the first calculation unit 101 and the predistorter may use the Volterra series with the same K, $M_k$ and $h_k(m_1, m_2, \ldots, m_k)$ to perform their respective processing.

In some embodiments, the memory polynomial is a simplified form of the Volterra series, and may be expressed in the form of Formula (2):

$$y(n)=\Sigma_{k=0}^{K-1}\Sigma_{m=0}^{M-1}\alpha_{km}x(n-m)|x(n-m)|^k \quad (2)$$

where $\alpha_{km}$ is a coefficient of the memory polynomial, K and M are the order and memory length, respectively, x(n) is a signal input to the memory polynomial, and y(n) is a signal processed by the memory polynomial.

In at least one embodiment, the first calculation unit 101 and the predistorter may use the memory polynomials with the same K, M and $\alpha_{km}$ to perform their respective processing.

Figure 2:
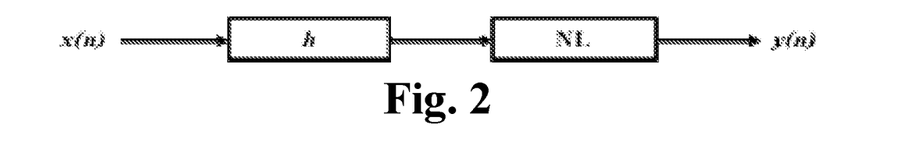
FIG. 2 is a schematic diagram of a structure of a Winner model of the first aspect of the embodiments.

In some embodiments, the structure of the Winner model is shown in FIG. 2, where h is a linear finite impulse response (FIR) filter, NL is a polynomial, x(n) is a signal input to the Winner model, y(n) is a signal processed by the Winner model. In at least one embodiment, the Winner model may be expressed in the form of Formula (3):

$$y(n)=\Sigma_{k=1}^{K}\alpha_k[\Sigma_{m=0}^{M-1}h(m)x(n-m)]^k \quad (3)$$

where $\alpha_k$ is a coefficient of the polynomial NL, and h(m) is a tap coefficient of the linear FIR filter h.

In at least one embodiment, the first calculation unit 101 and the predistorter may use the Winner model with the same K, M, $\alpha_k$ and h(m) to perform their respective processing.

Figure 3:
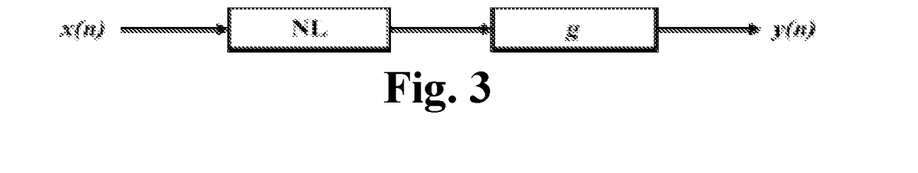
FIG. 3 is a schematic diagram of a structure of a Hammerstein model of the first aspect of the embodiments.

In some embodiments, the structure of the Hammerstein model is shown in FIG. 3, where g is a linear FIR filter, NL is a polynomial, x(n) is a signal input to the Hammerstein model, and y(n) is a signal processed by the Hammerstein model. In at least one embodiment, the Hammerstein model may be expressed in the form of Formula (4):

$$y(n)=\Sigma_{m=0}^{M-1}g(m)\Sigma_{k=1}^{K}\alpha_k x^k(n-m) \quad (4)$$

where $\alpha_k$ is a coefficient of the polynomial NL, and g(m) is a tap coefficient of the linear FIR filter g.

In at least one embodiment, the first calculation unit 101 and the predistorter may use the Hammerstein model with the same K, M, $\alpha_k$ and g(m) to perform their respective processing.

Figure 4:
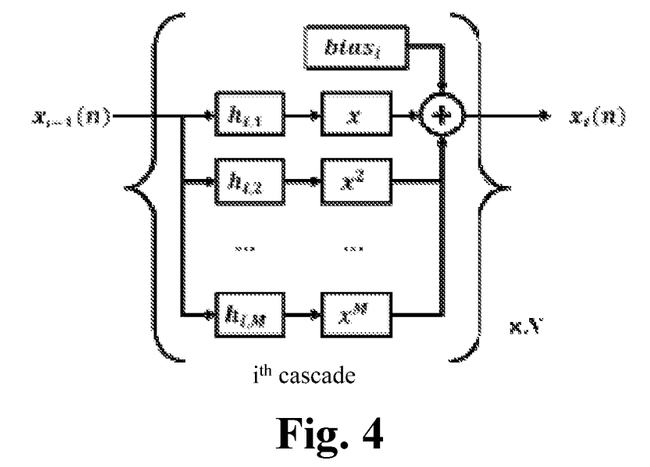
FIG. 4 is a schematic diagram of a structure of an M-P model of the first aspect of the embodiments.

In some embodiments, the structure of the M-P model is shown in FIG. 4, wherein the M-P model consists of N cascaded nonlinear modules, and an output of each cascade is an input of a next cascade. The structure of nonlinear module of each cascade is the same, including M parallel Winner-like units and a bias unit. Unlike the Winner model, a nonlinear functional formula of each Winner-like unit here is determined. In at least one embodiment, the nonlinear module of the $i^{th}$ cascade may be expressed in the form of Formula (5):

$$x_i(n)=\text{bias}_i+\Sigma_{j=1}^{M}[\Sigma_{t=0}^{L_{i,j}-1}h_{i,j}(t)x_{i-1}(n-t)]^j \quad (5)$$

where M is the number of parallel Winner-like units in each cascade of the nonlinear module, $L_{i,j}$ is a memory length of the $j^{th}$ Winner-like unit in the nonlinear module of the $i^{th}$ cascade, $1 \le i \le N$, $1 \le j \le M$, $h_{i,j}(t)$ is a tap coefficient of the linear FIR filter in the $j^{th}$ Winner-like unit in the nonlinear module of the $i^{th}$ cascade, $bias_i$ is a bias value in the nonlinear module of the $i^{th}$ cascade, $1 \leq i \leq N$, $1 \leq j \leq M$, $x_{i-1}(n)$ is an output of the nonlinear module of the (i−1)th cascade, and $x_i(n)$ is an output of the nonlinear module of the $i^{th}$ cascade.

In at least one embodiment, the first calculation unit 101 and the predistorter may use the M-P model with the same N, M, $L_{i,j}$, $h_{i,j}(t)$ and $bias_i$ to perform their respective processing.

In at least one embodiment, the second calculation unit 102 is also configured at the optical receiver side, and calculates a new digital distorter coefficient (referred to as a second distorter coefficient) using the signal before decision, the signal (the first reference signal) obtained after the first calculation unit 101 performs digital re-distorter processing on the signal after decision, and the signal after decision (optional). The new digital distorter coefficient is fed back to the digital predistorter on the optical transmitter side and the first calculation unit 101, and their original coefficients are replaced. The new digital distorter coefficient may be simultaneously fed back to the digital predistorter on the optical transmitter side and the first calculation unit 101. However, this disclosure is not limited to this. The new digital distorter coefficient may also be fed back at different times.

In at least one embodiment, in a complete updating process, the predistorter on the optical transmitter side performs predistortion processing on the signal input to the predistorter using the predistortion coefficients fed back from the optical receiver side; the predistorted signal is then sent to the optical receiver through the transmission link after subsequent processing by the optical transmitter; the optical receiver performs a series of processing on the received signal to obtain the signal before the decision, and the decider performs a decision on the signal before decision to obtain the signal after decision; the first calculation unit 101 performs re-distortion processing on the signal after decision using same first distorter coefficients as the predistorter coefficients of the predistorter, and finally the second calculation unit 102 generates new predistortion coefficients (second distorter coefficient). The new predistortion coefficients are fed back to the predistorter on the optical transmitter side and the first calculation unit 101 at the optical receiver side. The predistorter updates the current predistortion coefficients according to the received new predistortion coefficients, the first calculation unit 101 updates the current first distorter coefficients according to the new predistortion coefficients as the first distorter coefficients in a next updating process, and the process goes back and forth in this way. Therefore, apparatus nonlinearity may be compensated dynamically. The predistorter on the optical transmitter side is always running in real time, regardless of whether its coefficients are replaced or not. The distorter coefficient updating apparatus 100 may run in real time, or run in an offline manner (non-real time).

Figure 5:
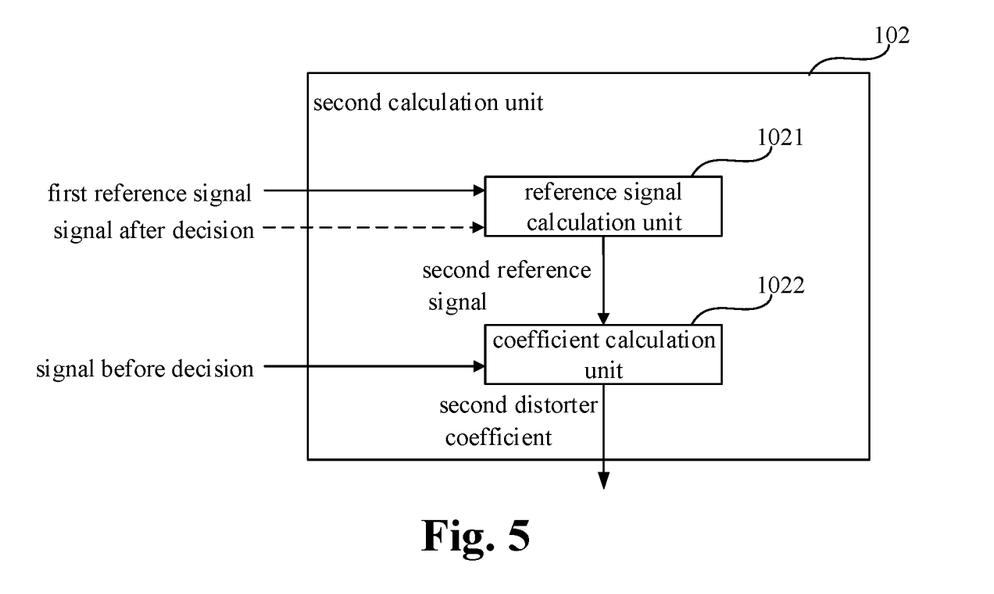
FIG. 5 is a schematic diagram of a structure of a second calculation unit of the first aspect of the embodiments.

FIG. 5 is a schematic diagram of a structure of a second calculation unit 102. In at least one embodiment, as shown in FIG. 5, the second calculation unit 102 may include: a reference signal calculation unit 1021 and a coefficient calculation unit 1022. The reference signal calculation unit 1021 calculates a second reference signal according to the first reference signal, or according to the first reference signal and the signal after decision. The coefficient calculation unit 1022 calculates the second distorter coefficients based on the second reference signal and the signal before decision.

The second reference signal is a signal that may be directly processed by the coefficient calculation unit 1022, e.g., the second reference signal may be a signal obtained after equalization and power normalization, etc. are performed on the first reference signal, or the second reference signal may also be a signal after power normalization is performed on the first reference signal.

Figure 6:
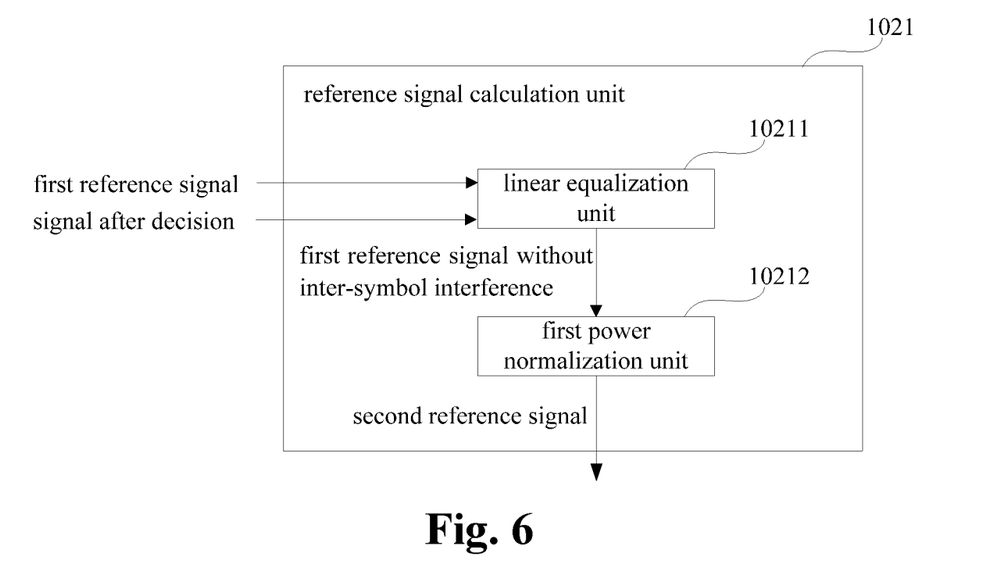
FIG. 6 is a schematic diagram of a structure of a reference signal calculation unit of the first aspect of the embodiments.

FIG. 6 is a schematic diagram of a structure of the reference signal calculation unit 1021. In at least one embodiment, when the reference signal calculation unit 1021 calculates the second reference signal according to the first reference signal and the signal after decision, as shown in FIG. 6, the reference signal calculation unit 1021 may include: a linear equalization unit 10211 and a first power normalization unit 10212. The linear equalization unit 10211 removes a linear inter-symbol interference within the first reference signal according to the signal after decision to generate a first reference signal without inter-symbol interference. The first power normalization unit 10212 performs power normalization on the first reference signal without linear inter-symbol interference to generate a second reference signal. Thus, when the second distorter coefficient is calculated, the accuracy of the second distorter coefficient may be improved, and the predistortion performance may be optimized.

The linear equalization unit 10211 may be any type of linear equalizer, such as, a minimum mean square error (MMSE) equalizer, or other linear equalizer that may realize the same function.

The first power normalization unit 10212 may normalize a root mean square (RMS) value of the input signal (the reference signal without linear inter-symbol interference) to a reference value with calculation formula of $$S_{out} = \frac{S_{in}}{sqrt(|S_{in}^2|)} * RMS_{ref},$$

where $S_{in}$ and $S_{out}$ represent input and output signal sequences of power normalization, respectively, sqrt($|S_{in}^2|$) represents a RMS value of the input signal sequence $S_{in}$, $RMS_{ref}$ is the reference value of RMS. For signals in different modulation format, $RMS_{ref}$ may be different. For example, when the modulation format is 16QAM or PAM4, $RMS_{ref}=\sqrt{5}$; when the modulation format is 64QAM or PAM8, $RMS_{ref}=\sqrt{21}$; and in this way, the reference value of RMS is calculated by analogy according to the definition of standard constellation point in the modulation format. For signals of probabilistic shaping (PS) modulation format, its $RMS_{ref}$ value may also be calculated according to the shaping method and modulation format specifically used.

Figure 7:
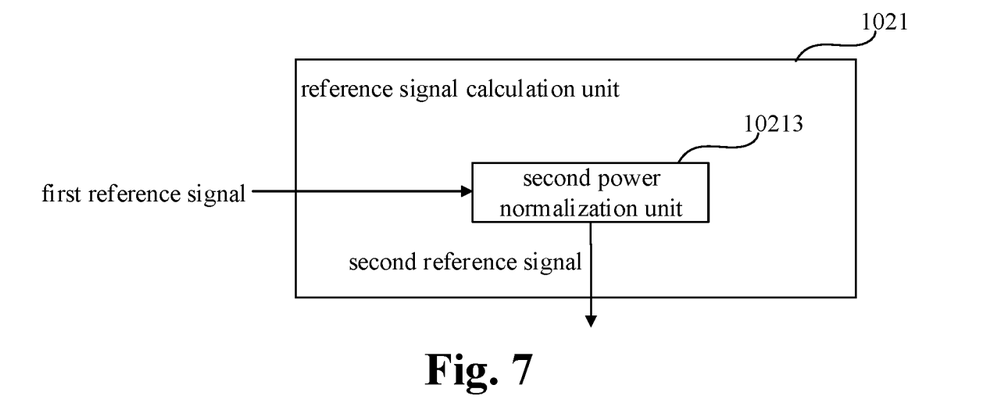
FIG. 7 is another schematic diagram of a structure of the reference signal calculation unit of the first aspect of the embodiments.

FIG. 7 is another schematic diagram of a structure of the reference signal calculation unit 1021. In at least one embodiment, when the reference signal calculation unit 1021 calculates the second reference signal according to the first reference signal, as shown in FIG. 7, the reference signal calculation unit 1021 may only include a second power normalization unit 10213. The second power normalization unit 10213 performs power normalization on the first reference signal to generate the second reference signal. Therefore, the second reference signal may be generated in a simpler manner.

The method of performing power normalization on the first reference signal may be the same as or similar to the foregoing method of performing power normalization on the reference signal without linear inter-symbol interference, and the first power normalization unit 10212 may be the same as or similar to the second power normalization unit 10213.

In at least one embodiment, the coefficient calculation unit 1022 may calculate the distorter coefficients using a gradient descent method or a least square method according to the second reference signal and the signal before decision.

In at least one embodiment, the second calculation unit 102 may further include a feedback unit (not shown in drawings), which feeds the second distorter coefficient back to the first calculation unit 101 and the predistorter on the optical transmitter side. The feedback unit may be implemented in any form, as long as the first calculation unit 101 and the predistorter on the optical transmitter side may acquire the second distorter coefficient. For example, when the distorter coefficient updating apparatus 100 is implemented in software, the feedback unit may be a software instruction; and when feeding the second distorter coefficient back to the predistorter, the feedback unit may be hardware with signal transmission function, which is not specifically limited in this disclosure.

In at least one embodiment, considering that changes of nonlinear characteristics of an optical communication apparatus are generally slow, the distorter coefficient updating apparatus 100 may calculate the distorter coefficients in an offline manner independent of an existing digital signal processing (DSP) process of the optical receiver. In addition, the first calculation unit 101 and the second calculation unit 102 may be implemented in software. Therefore, a more complex and high-performance method may be adopted without increasing the requirements on hardware resources of the optical receiver, and the changes to the hardware of the optical receiver are very small.

For example, the distorter coefficient updating apparatus 100 may perform operations of generating the second distorter coefficient when a prescribed condition is satisfied. For example, the distorter coefficient updating apparatus 100 may perform a next operation of generating the second distorter coefficient when a prescribed time has elapsed after the second distorter coefficient is generated. Alternatively, the distorter coefficient updating apparatus 100 may also determine the predistortion performance, and perform the next operation of generating the second distorter coefficient after the predistortion performance is lower than the prescribed condition. However, this disclosure is not limited to this. The distorter coefficient updating apparatus 100 may also adopt other methods to determine whether the operation of generating the second distorter coefficient needs to be performed.

In at least one embodiment, the second calculation unit 102 may feed the calculated second distorter coefficient back to the predistorter on the optical transmitter side in real time. That is, after calculating the second distorter coefficient, the second calculation unit 102 transmits the second distorter coefficient to the predistorter at the transmitter side to make the predistorter update the predistortion coefficients. Thus, the predistorter may dynamically and timely update the predistortion coefficients.

In at least one embodiment, the first calculation unit 101 and the predistorter on the optical transmitter side may update coefficients at the same time, so that it may be ensured that the coefficients used for re-distortion processing by the first calculation unit 101 are the same as the coefficients used for predistortion processing by the predistorter on the optical transmitter side. However, this disclosure is not limited to this. As long as it is ensured that the first distorter coefficient used by the distorter coefficient updating apparatus 100 when calculating the second distorter coefficient is the same as the predistortion coefficient used by the predistorter on the optical transmitter side.

In at least one embodiment, the distorter coefficient updating apparatus 100 may further include a distorter coefficient setting unit (not shown in drawings). The distorter coefficient setting unit may set an initial distorter coefficient. When the second calculation unit 102 performs the operation of generating the second distorter coefficient for a first time, the initial distorter coefficient may be used as the first distorter coefficient of the first calculation unit 101. The distorter coefficient setting unit may set the initial distorter coefficient in any way, which is not specifically limited in this disclosure.

In at least one embodiment, the predistorter is configured at the optical transmitter side, and performs real-time predistortion processing on the data signal to be transmitted in a hardware-implementation manner.

In at least one embodiment, the predistorter may perform re-distortion processing on a sequence of symbols input to the predistorter. A sampling rate of the predistorter may be 1 sampling point per symbol. Therefore, when the second distorter coefficient is calculated at the optical receiver side, the input signals (the signal before decision and the signal after decision) input to the distorter coefficient updating apparatus 100 are a sequence of symbols naturally aligned in time, thus no additional synchronization is required.

According to the distorter coefficient updating apparatus 100 in this embodiment, the update of digital distorter coefficients is carried out at the optical receiver side without knowing specific data information transmitted by the optical transmitter. In addition, it only needs to feed back the predistorter coefficients with a very small amount of information from the optical receiver to the optical transmitter, which occupies very few channel resources.

Second Aspect of the Embodiments

This embodiment provides a distorter coefficient updating method applied at an optical receiver side. Since the principle of this method for solving a problem is similar to that of the apparatus in the first aspect of the embodiments, the implementation of the apparatus in the first aspect of the embodiments may be referred to for the specific implementation of the method, and the same content will not be repeated.

Figure 8:
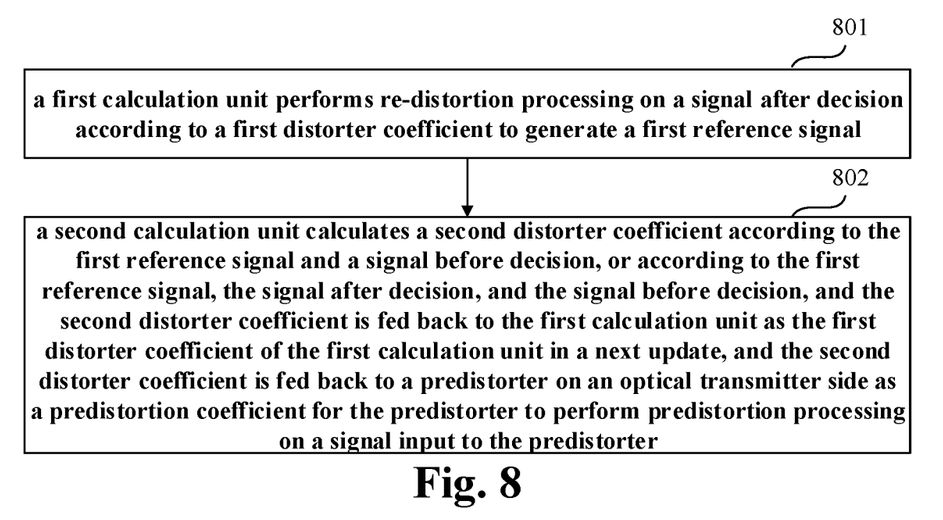
FIG. 8 is a schematic diagram of an embodiment of a distorter coefficient updating method of the second aspect of the embodiments.

FIG. 8 is a schematic diagram of an embodiment of a distorter coefficient updating method. As shown in FIG. 8, the distorter coefficient updating method includes:

Operation 801: a first calculation unit performs re-distortion processing on a signal after decision according to a first distorter coefficient to generate a first reference signal;

Operation 802: a second calculation unit calculates a second distorter coefficient according to the first reference signal and a signal before decision, or according to the first reference signal, the signal after decision, and the signal before decision, and the second distorter coefficient is fed back to the first calculation unit as the first distorter coefficient of the first calculation unit in a next update, and the second distorter coefficient is fed back to a predistorter on an optical transmitter side as a predistortion coefficient for the predistorter to perform predistortion processing on a signal input to the predistorter.

According to the distorter coefficient updating method in this embodiment, the update of digital distorter coefficients is carried out at the optical receiver side without knowing specific data information transmitted by the optical transmitter. In addition, it only needs to feed back the predistorter coefficients with a very small amount of information from the optical receiver to the optical transmitter, which occupies very few channel resources.

In at least one embodiment, structure and coefficients of the first calculation unit are the same as those of the predistorter on the optical transmitter side. For example, the re-distortion processing performed by the first calculation unit at the optical receiver side and the predistortion processing performed by the predistorter on the optical transmitter side may be same processing.

The first calculation unit and the predistorter on the optical transmitter side may use the same distorter model. The distorter models used by the first calculation unit and the predistorter may be Volterra series, a memory polynomial, a Winner model, a Hammerstein model, or a multistage-parallel (M-P) model.

The first distorter coefficient used by the first calculating unit when performing the re-distortion processing is the same as the predistortion coefficient used by the predistorter when performing the predistortion processing.

Figure 9:
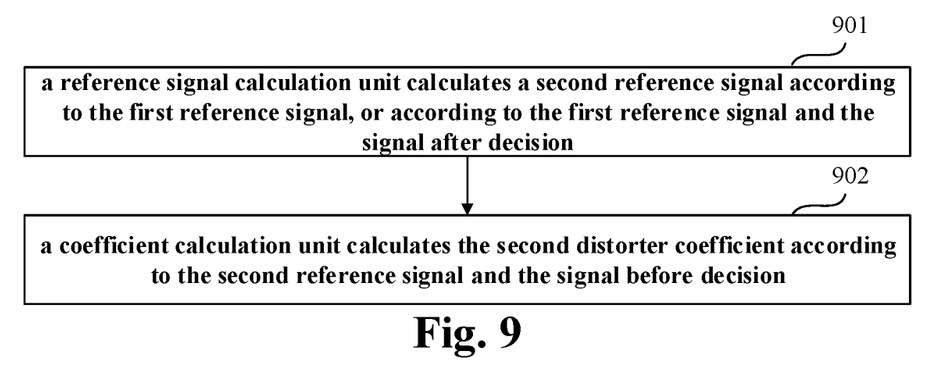
FIG. 9 is a schematic diagram of an embodiment of Operation 802 in FIG. 8.

FIG. 9 is a schematic diagram of an embodiment of Operation 802 in FIG. 8. In at least one embodiment, as shown in FIG. 9, Operation 802 may include:

Operation 901: a reference signal calculation unit calculates a second reference signal according to the first reference signal, or according to the first reference signal and the signal after decision; and Operation 902: a coefficient calculation unit calculates the second distorter coefficient according to the second reference signal and the signal before decision.

Figure 10:
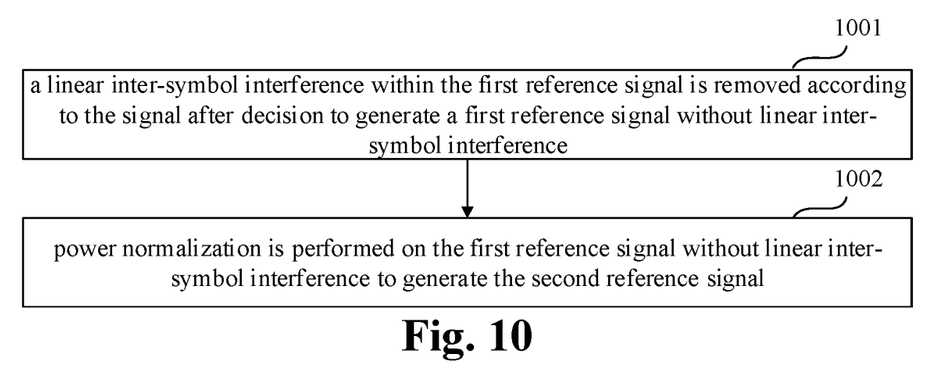
FIG. 10 is a schematic diagram of an embodiment of Operation 901 in FIG. 9.

FIG. 10 is a schematic diagram of an embodiment of Operation 901 in FIG. 9. In at least one embodiment, in the case of calculating the second reference signal according to the first reference signal and the signal after decision, as shown in FIG. 10, Operation 901 may include:

Operation 1001: a linear inter-symbol interference within the first reference signal is removed according to the signal after decision to generate a first reference signal without linear inter-symbol interference; and Operation 1002: power normalization is performed on the first reference signal without linear inter-symbol interference to generate the second reference signal.

Thus, when the second distorter coefficient is calculated according to the second reference signal generated in this way, the accuracy of the second distorter coefficient may be improved, and the predistortion performance may be optimized.

Figure 11:
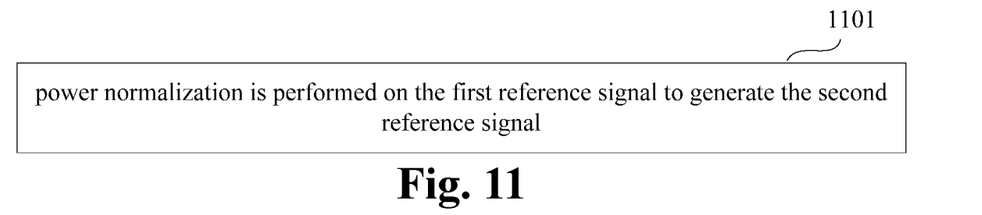
FIG. 11 is a schematic diagram of another embodiment of Operation 901 in FIG. 9.

FIG. 11 is a schematic diagram of another embodiment of Operation 901 in FIG. 9. In at least one embodiment, in the case of calculating the second reference signal according to the first reference signal, as shown in FIG. 11, Operation 901 includes:

Operation 1101: power normalization is performed on the first reference signal to generate the second reference signal.

Therefore, the second reference signal may be generated in a simpler manner.

In at least one embodiment, in Operation 902, a gradient descent method or a least squares method is used to calculate the second distorter coefficient according to the second reference signal and the signal before decision.

In at least one embodiment, considering that changes of nonlinear characteristics of an optical communication apparatus is generally slow, the distorter coefficient updating method may calculate the distorter coefficients in an offline manner independent of an existing digital signal processing (DSP) process of the optical receiver. In addition, the distorter coefficient updating method may be implemented in software. Therefore, requirements on hardware resources of the optical receiver are not increased, and the changes to the hardware of the current optical receiver are very small. For example, the operation of generating the second distorter coefficient may be performed when a prescribed condition is satisfied.

Figure 12:
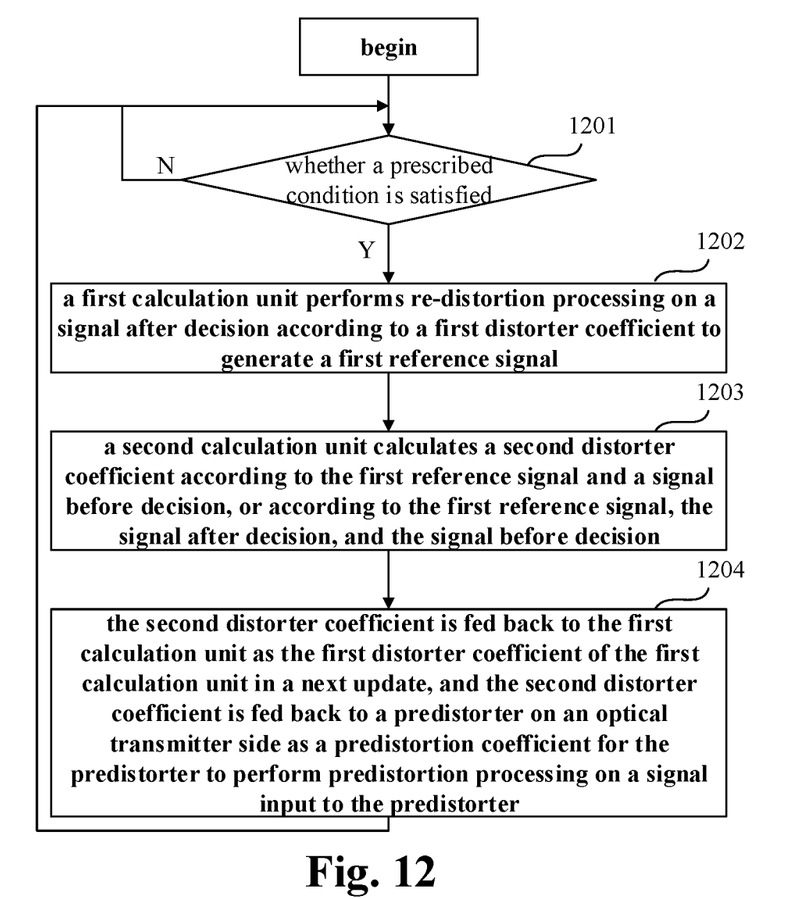
FIG. 12 is a schematic diagram of another embodiment of the distorter coefficient updating method of the second aspect of the embodiments.

FIG. 12 is a schematic diagram of another embodiment of the distorter coefficient updating method. As shown in FIG. 12, the distorter coefficient updating method may include:

Operation 1201: it is determined whether a prescribed condition is satisfied, wherein the prescribed condition may be that a prescribed time has elapsed after the second distorter coefficient is generated last time, or the current predistortion performance is lower than the prescribed condition, or the like. When it is determined that the prescribed condition is not satisfied, go back to Operation 1201; and when it is determined that the prescribed condition is satisfied, go to Operation 1202.

Operation 1202: a first calculation unit performs re-distortion processing on a signal after decision according to a first distorter coefficient to generate a first reference signal;

Operation 1203: a second calculation unit calculates a second distorter coefficient according to the first reference signal and a signal before decision, or according to the first reference signal, the signal after decision, and the signal before decision;

Operation 1204: the second distorter coefficient is fed back to the first calculation unit as the first distorter coefficient of the first calculation unit in a next update, and the second distorter coefficient is fed back to a predistorter on an optical transmitter side as a predistortion coefficient for the predistorter to perform predistortion processing on a signal input to the predistorter.

Operation 1202 is the same as Operation 801, its contents are incorporated here and are not repeated here. Operations 1203 and 1204 are the same as Operation 802, and their contents are incorporated here and are not repeated here.

In at least one embodiment, in Operation 1204, the second distorter coefficient may be transmitted to the predistorter on the optical transmitter side in real time. That is, after the second distorter coefficient is calculated in Operation 1203, the second distorter coefficient is transmitted to the predistorter at the transmitter side, and the predistorter coefficients are updated. Thus, the predistorter may dynamically and timely update the predistortion coefficients.

In at least one embodiment, the updating process stops when a certain condition is satisfied. For example, the predistorter does not need to update the coefficients, when the certain condition is satisfied, for example, the predistorter stops the predistortion processing, so as to stop the updating process.

In at least one embodiment, the predistorter may perform predistortion processing on a sequence of symbols input to the predistorter. A sampling rate of the predistorter may be 1 sampling point per symbol. Therefore, when the second distorter coefficient is calculated at the optical receiver side, the signal before decision and the signal after decision are a sequence of symbols naturally aligned in time, thus no additional synchronization is required.

According to the distorter coefficient updating method in this embodiment, the update of digital distorter coefficients is carried out at the optical receiver side without knowing specific data information transmitted by the optical transmitter. In addition, it only needs to feed back the predistorter coefficients with a very small amount of information from the optical receiver to the optical transmitter, which occupies very few channel resources.

Third Aspect of the Embodiments

This embodiment provides a digital predistortion apparatus.

Figure 13:
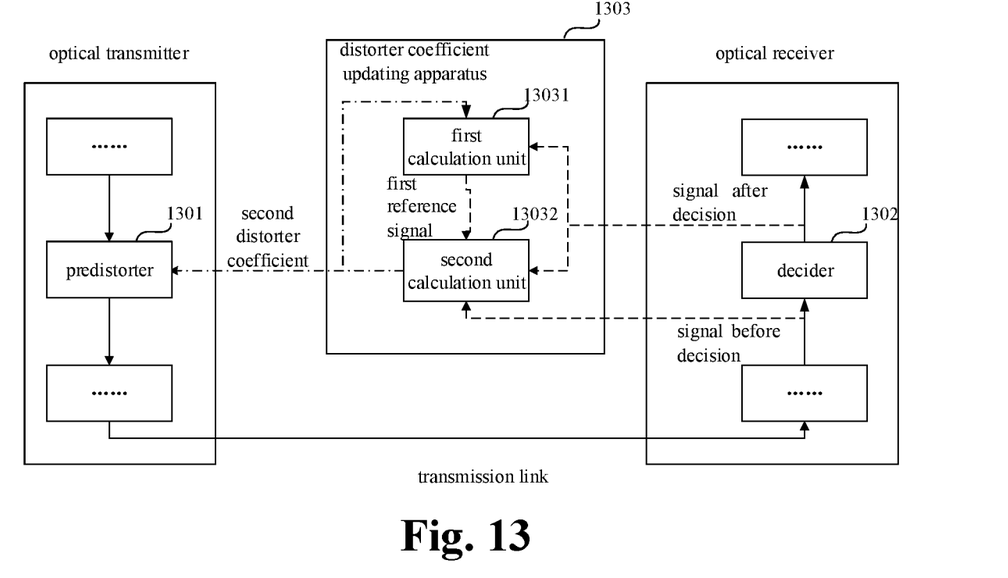
FIG. 13 is a schematic diagram of an example of a digital predistortion apparatus of the third aspect of the embodiments.

FIG. 13 is a schematic diagram of a digital predistortion apparatus according to an embodiment of this disclosure, wherein part of processing units of an optical transmitter and an optical receiver are omitted in FIG. 13. And reference may be made to related technologies for the part of processing units.

As shown in FIG. 13, the digital predistortion apparatus may include: a predistorter 1301, a decider 1302 and a distorter coefficient updating apparatus 1303.

The predistorter 1301 is configured in the optical transmitter, and performs predistortion processing on the signal input to the predistorter 1301 in real time according to predistortion coefficients.

The decider 1302 is configured in the optical receiver, and decides the input signal before decision and generates a signal after decision.

The distorter coefficient updating apparatus 1303 is configured at the optical receiver side, and includes: a first calculation unit 13031 and a second calculation unit 13032. The first calculation unit 13031 performs re-distortion processing on the signal after decision according to a first distorter coefficient to generate a first reference signal. The second calculation unit 13032 calculates a second distorter coefficient according to the first reference signal and the signal before decision, or according to the first reference signal, the signal after decision, and the signal before decision, and feeds the second distorter coefficient back to the first calculation unit 13031 as the first distorter coefficient of the first calculation unit 13031 in a next update, and feeds the second distorter coefficient back to the predistorter 1301 as a predistortion coefficient for the predistorter 1301 to perform predistortion processing on the signal input to the predistorter 1301.

According to the digital predistortion apparatus in this embodiment, the update of digital distorter coefficients is carried out at the optical receiver side without knowing specific data information transmitted by the optical transmitter. In addition, it only needs to feed back the predistorter coefficients with a very small amount of information from the optical receiver to the optical transmitter, which occupies very few channel resources.

In at least one embodiment, the distorter coefficient updating apparatus 1303 may be the distorter coefficient updating apparatus 100 in the first aspect of the embodiments, and the predistorter 1301 may be the predistorter in the first aspect of the embodiments, its contents are incorporated here and are not repeated here.

As shown in FIG. 13, a solid line with an arrow (→) represents a real-time signal, a dotted line with an arrow (→) represents an off-time signal, and a dot-and-dash line with an arrow (→) represents a data stream of second distorter coefficient. The predistorter 1301 in the optical transmitter performs real-time processing on a signal input to the predistorter 1301, and the decider 1302 in the optical receiver performs real-time processing on the signal before decision to generate the signal after decision. The distorter coefficient updating apparatus 1303 may calculate the second distorter coefficient according to the signal before decision and the signal after decision in an offline manner, and feed the second distorter coefficient back to the first calculation unit 13031 and the predistorter 1301, so that the first calculation unit 13031 updates the first distorter coefficient according to the second distorter coefficient, and the predistorter 1301 updates the predistortion coefficients according to the second distorter coefficient.

In at least one embodiment, in a complete updating process, the predistorter 1301 on the optical transmitter side performs predistortion processing on the signal input to the predistorter 1301 using the predistortion coefficients fed back from the optical receiver side; the predistorted signal is then sent to the optical receiver through the transmission link after subsequent processing by the optical transmitter, where the subsequent processing may be signal processing, digital-to-analog conversion, amplification, modulation, or the like and reference may be made to related technologies for details; the optical receiver performs a series of processing on the received signal to obtain the signal before decision; the decider 1302 decides the signal before decision to obtain the signal after decision, wherein the series of processing may be photoelectric conversion, analog-digital conversion, signal processing, or the like and reference may be made to related technologies for details; the first calculation unit 13031 performs re-distortion processing on the signal after decision using the same first distorter coefficient as the predistortion coefficient of the predistorter 1301, and finally, the second calculation unit 13032 generates a new predistortion coefficient (second distorter coefficient), and the new predistortion coefficient is fed back to the predistorter 1301 on the optical transmitter side and the first calculation unit 13031 at the optical receiver side. The predistorter 1301 updates the current predistortion coefficient according to the received new predistortion coefficient. The first calculation unit 13031 updates the current first distorter coefficient according to the new predistortion coefficient as the first distorter coefficient in a next updating process, and the process goes back and forth in this way. Therefore, apparatus nonlinearity may be compensated dynamically. The predistorter 1301 on the optical transmitter side is always running in real time, regardless of whether its coefficients are replaced or not. The distorter coefficient updating apparatus 1303 may run in real time, or may run in an offline manner.

According to the digital predistortion apparatus in this embodiment, the update of digital distorter coefficients is carried out at the optical receiver side without knowing specific data information transmitted by the optical transmitter. In addition, it only needs to feed back the predistorter coefficients with a very small amount of information from the optical receiver to the optical transmitter, which occupies very few channel resources.

Fourth Aspect of the Embodiments

This embodiment provides an optical receiver.

Figure 14:
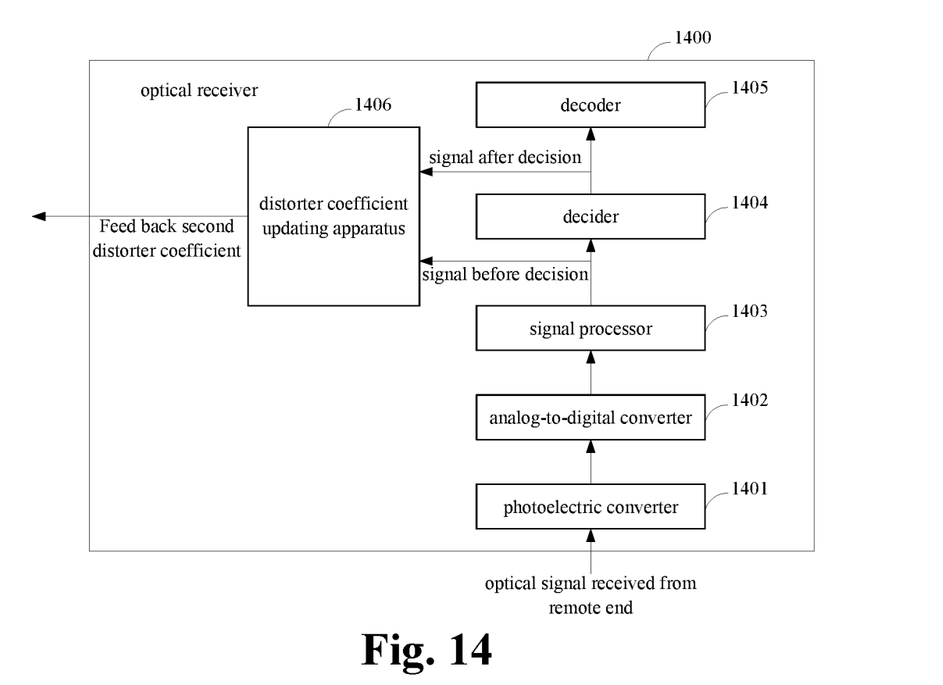
FIG. 14 is a schematic diagram of an example of an optical receiver of the fourth aspect of the embodiments.

FIG. 14 is a schematic diagram of an example of an optical receiver 1400. As shown in FIG. 14, the optical receiver 1400 includes: a photoelectric converter 1401, an analog-to-digital converter 1402, a signal processor 1403, a decider 1404, a decoder 1405 and a distorter coefficient updating apparatus 1406.

In the embodiment of this disclosure, the photoelectric converter 1401 performs a photoelectric conversion on the received optical signal to obtain a photoelectrically converted signal (electrical signal). The analog-to-digital converter 1402 performs an analog-to-digital conversion on the photoelectrically converted signal to obtain an analog-digital converted signal (digital signal). The signal processor 1403 performs digital processing on the analog-to-digital converted signal to obtain the digital processed signal, that is, the signal before decision. The decider 1404 decides the digital processed signal, to obtain the signal after decision (corresponding to a symbol after decision). The decoder 1405 decodes the signal after decision to obtain a decoded signal (reverted to a transmitted data bit stream).

In the embodiment, the signal processor 1403 may process the analog-to-digital converted signal based on related technologies. For example, for a dual-polarization quadrature amplitude modulation (DP-xQAM) signal, digital processing may include re-sampling, orthogonalization, adaptive equalization polarization demultiplexing based on constant modulus algorithm, frequency offset estimation and carrier phase recovery, or the like. For signals of other modulation formats, such as pulse amplitude modulation (PAM) based on an intensity modulation-direct detection system, the signal processor 1403 may also use a corresponding mature DSP.

In the embodiment, the decider 1404 may adopt a hard decision or a soft decision, which is not limited in this disclosure.

It should be noted that this disclosure does not limit the implementations of the photoelectric converter 1401, the analog-to-digital converter 1402, the signal processor 1403, the decider 1404 and the decoder 1405. And reference may be made to the related art of the optical receiver.

In the embodiment of this disclosure, the distorter coefficient updating apparatus 1406 may be the distorter coefficient updating apparatus in the first aspect of the embodiments, and implements the method in the second aspect of the embodiments. For example, re-distortion processing on the signal after decision is performed according to the first distorter coefficient to generate the first reference signal; the second distorter coefficient is calculated according to the first reference signal and the signal before decision, or according to the first reference signal, the signal after decision and the signal before decision, and the second distorter coefficient is fed back to the first calculation unit as a first distorter coefficient of the first calculation unit in the next update, and the second distorter coefficient is fed back to the predistorter on the optical transmitter side as a predistortion coefficient for the predistorter to perform predistortion processing on a signal input to the predistorter. Reference may be made to Embodiments 1 and 2 for specific processing procedures, and the description is omitted here.

In the embodiment, the distorter coefficient updating apparatus 1406 is configured in the optical receiver 1400 as an example. However, this disclosure is not limited to this. The distorter coefficient updating apparatus 1406 may also be configured on the same side as the optical receiver 1400, for example, the distorter coefficient updating apparatus 1406 is configured to be a chip or product coupled to the optical receiver 1400.

The embodiment of this disclosure also provides an optical transmitter.

Figure 15:
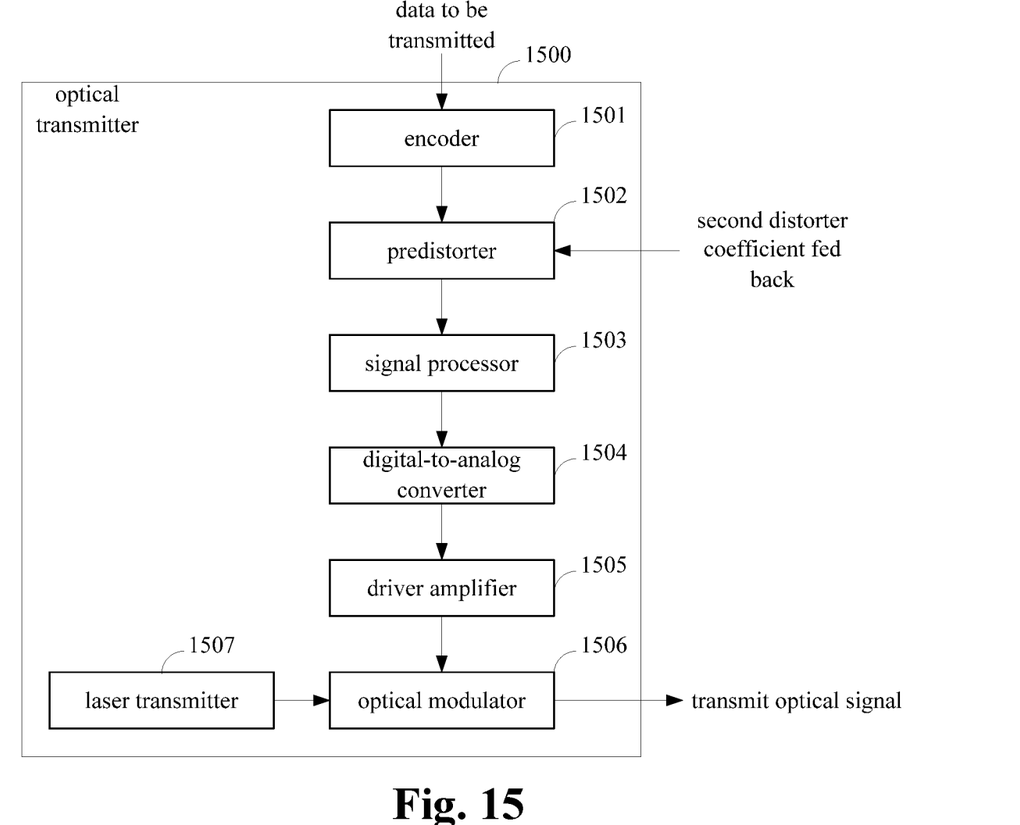
FIG. 15 is a schematic diagram of an example of an optical transmitter of the fourth aspect of the embodiments.

FIG. 15 is a schematic diagram of an example of an optical transmitter 1500. As shown in FIG. 15, the optical transmitter 1500 includes: an encoder 1501, a predistorter 1502, a signal processor 1503, a digital-to-analog converter 1504, a driver amplifier 1505, an optical modulator 1506 and a laser transmitter 1507.

In the embodiment of this disclosure, a bit stream data signal to be transmitted is a sequence of symbols after being encoded by the encoder 1501, and the predistorter 1502 performs predistortion processing using the second distorter coefficient fed back by the optical receiver 1400, and the predistorted signal is digital processed by the signal processor 1503 and becomes a signal that may be processed by the digital-to-analog converter 1504. The electrical signal output by the digital-to-analog converter 1504 is amplified by the driver amplifier 1505 and then input to a radio frequency input end of the optical modulator 1506. The optical modulator 1506 loads the signal input to the radio frequency input end onto an optical signal by means of the laser transmitter 1507 and transmit the signal to the optical receiver at the peer end.

In the embodiment, the signal processor 1503 may perform digital processing on the predistorted signal based on the prior art, such as: up-sampling, pulse shaping, linear pre-equalization, RMS locking, peak clipping, re-sampling, quantization or the like. Reference may be made to the related art for details, and the description is omitted here.

It should be noted that this disclosure does not limit the implementation methods of the encoder 1501, the predistorter 1502, the signal processor 1503, the digital-to-analog converter 1504, the driver amplifier 1505, the optical modulator 1506, and the emitting laser 1507. Reference may be made to the related art of the optical transmitter.

The embodiment of this disclosure also provides an optical transceiver. The optical transceiver includes: an optical transmitter and an optical receiver. The optical transmitter transmits an optical signal to the optical receiver at the peer end. Reference may be made to FIG. 15 for the structure of the optical transmitter. However, this disclosure is not limited to this. The optical receiver receives the optical signal transmitted by the optical transmitter at the peer end. Reference may be made to FIG. 14 for the structure of the optical receiver. However, this disclosure is not limited to this.

According to the optical receiver in this embodiment, digital distorter coefficients are updated at the optical receiver side without knowing specific data information transmitted by the optical transmitter. In addition, it only needs to feed back the predistorter coefficients with a very small amount of information from the optical receiver to the optical transmitter, which occupies very few channel resources.

Fifth Aspect of the Embodiments

The embodiment of this disclosure provides an optical communication system.

Figure 16:
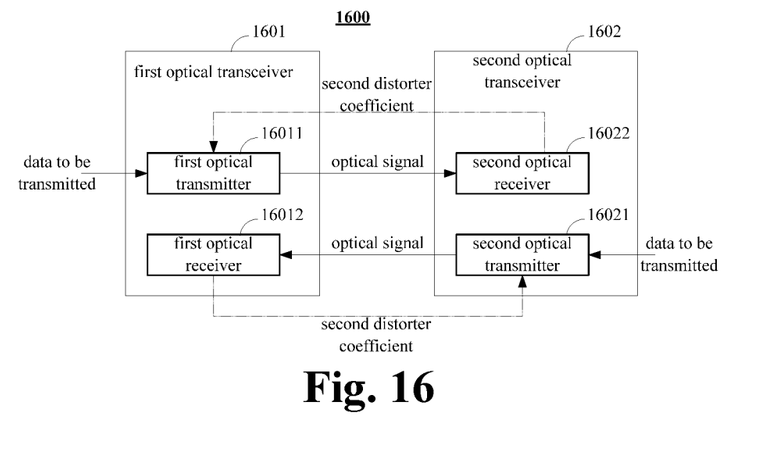
FIG. 16 is a schematic diagram of an optical communication system of the fifth aspect of the embodiments.

FIG. 16 is a schematic diagram of an optical communication system 1600. As shown in FIG. 16, the optical communication system 1600 includes: a first optical transceiver 1601 and a second optical transceiver 1602. The first optical transceiver 1601 includes: a first optical transmitter 16011 and a first optical receiver 16012, and the second optical transceiver 1602 includes: a second optical transmitter 16021 and a second optical receiver 16022.

In some embodiments, the first optical transmitter 16011 transmits an optical signal to the second optical receiver 16022, and the second optical receiver 16022 receives the optical signal. The second optical receiver 16022 includes the distorter coefficient updating apparatus in the first aspect of the embodiments, which generates a second distorter coefficient and feeds the second distorter coefficient back to the first optical transmitter 16011.

In some embodiments, the second optical transmitter 16021 transmits an optical signal to the first optical receiver 16012, and the first optical receiver 16012 receives the optical signal. The first optical receiver 16012 includes the distorter coefficient updating apparatus in the first aspect of the embodiments, which generates the second distorter coefficient and feeds the second distorter coefficient back to the second optical transmitter 16021.

The distorter coefficient updating apparatus has been described in detail in the first aspect of the embodiments, of which the contents are incorporated here and are not repeated here.

An embodiment of this disclosure also provides a computer-readable program, which, when executed in a distorter coefficient updating apparatus, will cause the distorter coefficient updating apparatus to carry out the method as described in the second aspect of the embodiments.

An embodiment of this disclosure provides a storage medium storing a computer readable program, which will cause the distorter coefficient updating apparatus to execute the method as described in the second aspect of the embodiments.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or operations as described above. This disclosure also relates to a storage medium for storing the above program, such as a hard disk, a floppy disk, a CD, a DVD, and a flash memory, etc.

The method/apparatus described with reference to the embodiments of this disclosure may be directly embodied as hardware, a software module executed by a processor, or a combination of the hardware and software module. For example, one or more of the functional block diagrams and/or one or more combinations of the functional block diagrams shown in FIGS. 1, 5-7 may either correspond to software modules of procedures of a computer program, or correspond to hardware modules. Such software modules may respectively correspond to the Operations shown in FIGS. 8-12. And the hardware modules, for example, may be carried out by firming the software modules by using a field programmable gate array (FPGA).

The software module may be located in a RAM, a flash memory, a ROM, an EPROM, an EEPROM, a register, a hard disc, a floppy disc, a CD-ROM, or any memory medium in other forms known in the art. A memory medium may be coupled to a processor, such that the processor may be able to read information from the memory medium, and write information to the memory medium; or the memory medium may be a component of the processor. The processor and memory medium may be located in an ASIC. The soft modules may be stored in a memory of a mobile terminal, and may also be stored in a memory card of a pluggable mobile terminal. For example, if equipment employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks described with respect to the figures may be realized as a universal processor, a digital signal processor (DSP), an application specific integrated circuit (ASIC), a field programmable gate array (FPGA) or other programmable logic devices, discrete gate or transistor logic devices, discrete hardware component, or any appropriate combinations thereof carrying out the functions described in this application. And the one or more functional block diagrams and/or one or more combinations of the functional block diagrams described with respect to the figures may also be realized as a combination of computing equipment, such as a combination of a DSP and a microprocessor, multiple processors, one or more microprocessors in communication combination with the DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the spirits and principle of this disclosure, and such variants and modifications fall within the scope of this disclosure.

As to the implementations including the above embodiments, following supplements are further disclosed:

1. A distorter coefficient updating method applied at an optical receiver side, including:

performing, by a first calculation unit, re-distortion processing on a signal after decision according to a first distorter coefficient to generate a first reference signal; and calculating, by a second calculation unit, a second distorter coefficient according to the first reference signal and a signal before decision, or according to the first reference signal, the signal after decision, and the signal before decision, and feeding the second distorter coefficient back to the first calculation unit as the first distorter coefficient of the first calculation unit in a next update, and feeding the second distorter coefficient back to a predistorter on an optical transmitter side as a predistortion coefficient for the predistorter to perform predistortion processing on the signal input to the predistorter.

2. The distorter coefficient updating method according to the supplement 1, wherein the first calculation unit has the same structure and coefficients as the predistorter on the optical transmitter side.

3. The distorter coefficient updating method according to the supplement 2, wherein the first calculation unit and the predistorter on the optical transmitter side adopt the same distorter model, and the distorter model includes: Volterra series, or a memory polynomial, or a Winner model, or a Hammerstein model, or a multistage-parallel (M-P) nonlinear model.

4. The distorter coefficient updating method according to the supplement 1, wherein the operation of calculating, by the second calculation unit, a second distorter coefficient according to the first reference signal and the signal before decision, or according to the first reference signal, the signal after decision, and the signal before decision, includes:

calculating, by a reference signal calculation unit, a second reference signal according to the first reference signal, or according to the first reference signal and the signal after decision; and calculating, by a coefficient calculation unit, the second distorter coefficient according to the second reference signal and the signal before decision.

5. The distorter coefficient updating method according to the supplement 4, wherein the operation of calculating a second reference signal according to the first reference signal and the signal after decision includes:

removing a linear inter-symbol interference within the first reference signal according to the signal after decision to generate a first reference signal without linear inter-symbol interference; and performing power normalization on the first reference signal without linear inter-symbol interference to generate a second reference signal.

6. The distorter coefficient updating method according to the supplement 4, wherein the operation of calculating the second reference signal according to the first reference signal includes:

performing power normalization on the first reference signal to generate the second reference signal.

7. The distorter coefficient updating method according to the supplement 4, wherein the coefficient calculation unit uses a gradient descent method or a least square method according to the second reference signal and the signal before decision to calculate the second distorter coefficient.

8. The distorter coefficient updating method according to the supplement 1, wherein the predistorter performs predistortion processing on a sequence of symbols input to the predistorter.

9. The distorter coefficient updating method according to the supplement 8, wherein a sampling rate of the predistorter is 1 sampling point per symbol.

10. An optical receiver, including:
a photoelectric converter configured to perform a photoelectric conversion on the received optical signal to obtain a photoelectrically converted signal;
an analog-to-digital converter configured to perform an analog-to-digital conversion on the photoelectrically converted signal to obtain an analog-to-digital converted signal;
a signal processor configured to perform digital processing on the analog-to-digital converted signal to obtain a digital processed signal;
a decider configured to decide the digital processed signal to obtain a signal after decision; and
a decoder configured to decode the signal after decision to obtain a decoded signal;
wherein, the optical receiver further includes:
a distorter coefficient updating apparatus, including:
a first calculation unit configured to perform re-distortion processing on a signal after decision according to a first distorter coefficient to generate a first reference signal; and
a second calculation unit configured to calculate a second distorter coefficient according to the first reference signal and a signal before decision, or according to the first reference signal, the signal after decision, and the signal before decision, and feed the second distorter coefficient back to the first calculation unit as the first distorter coefficient of the first calculation unit in a next update, and feed the second distorter coefficient back to a predistorter on an optical transmitter side as a predistortion coefficient for the predistorter to perform predistortion processing on a signal input to the predistorter.

11. An optical transceiver, including: an optical transmitter and an optical receiver, wherein the optical receiver includes a distorter coefficient updating apparatus configured to perform the distorter coefficient updating method according to any one of the supplements 1-9.

12. An optical communication system, including: a first optical transceiver and a second optical transceiver,
wherein the first optical transceiver includes: a first optical transmitter and a first optical receiver,
the second optical transceiver includes: a second optical transmitter and a second optical receiver,
the first optical transmitter transmits an optical signal to the second optical receiver, and the second optical receiver includes a distorter coefficient updating apparatus configured to perform the distorter coefficient updating method according to any one of the supplements 1-9; and/or
the second optical transmitter transmits an optical signal to the first optical receiver, the first optical receiver includes a distorter coefficient updating apparatus configured to perform the distorter coefficient updating method according to any one of the supplements 1-9.

What is claimed is:
1. A distorter coefficient updating apparatus at an optical receiver side, where an optical receiver comprises a decider configured to decide a signal before decision to generate a signal after decision, comprising:
a processor configured to:
perform a non-linear re-distortion processing on the signal after decision according to a first distorter coefficient to generate a first reference signal; and
calculate a second distorter coefficient according to the first reference signal and a the signal before decision, or according to the first reference signal, the signal after decision, and the signal before decision, and
wherein the second distorter coefficient is fed back to the processor as the first distorter coefficient in a next update, and the second distorter coefficient is fed back to a non-linear predistorter on an optical transmitter side as a predistortion coefficient of the non-linear predistorter,
wherein the first distorter coefficient adopted by the processor is a same coefficient as the predistortion coefficient adopted by the non-linear predistorter.

2. The distorter coefficient updating apparatus according to claim 1, wherein a distorter model adopted by the processor is a same model as a distorter model adopted by the non-linear predistorter.

3. The distorter coefficient updating apparatus according to claim 2, wherein the distorter model includes: Volterra series, or a memory polynomial, or a Winner model, or a Hammerstein model, or a multistage parallel (M-P) model.

4. The distorter coefficient updating apparatus according to claim 1, wherein the processor is further configured to:
calculate a second reference signal according to the first reference signal, or according to the first reference signal and the signal after decision; and
calculate the second distorter coefficient according to the second reference signal and the signal before decision.

5. The distorter coefficient updating apparatus according to claim 4, wherein the processor is further configured to:
remove a linear inter-symbol interference within the first reference signal according to the signal after decision to generate a first reference signal without linear intersymbol interference; and
perform power normalization on the first reference signal without linear inter-symbol interference to generate the second reference signal.

6. The distorter coefficient updating apparatus according to claim 4, wherein the processor is further configured to:
perform power normalization on the first reference signal to generate the second reference signal.

7. The distorter coefficient updating apparatus according to claim 4, wherein the processor is further configured to:
calculate the second distorter coefficient using a gradient descent method or a least square method according to the second reference signal and the signal before decision.

8. A distorter coefficient updating method applied at an optical receiver side where an optical receiver comprises a decider configured to decide a signal before decision to generate a signal after decision, comprising:
performing non-linear re-distortion processing on the signal after decision according to a first distorter coefficient to generate a first reference signal; and
calculating a second distorter coefficient according to the first reference signal and a the signal before decision, or according to the first reference signal, the signal after decision, and the signal before decision, and
wherein the second distorter coefficient is used as the first distorter coefficient of the non-linear re-distortion processing in a next update, and the second distorter coefficient is fed back to a non-linear predistorter on an optical transmitter side as a predistortion coefficient of the non-linear predistorter, wherein the first distorter coefficient adopted in the non-linear re-distortion processing is a same coefficient as the predistortion coefficient adopted by the non-linear predistorter.

9. The distorter coefficient updating method according to claim 8, wherein a distorter model adopted in the non-linear re-distortion processing is a same model as a distorter model adopted by the non-linear predistorter.

10. The distorter coefficient updating method according to claim 9, wherein the distorter model includes: Volterra series, or a memory polynomial, or a Winner model, or a Hammerstein model, or a multistage-parallel (M-P) nonlinear model.

11. The distorter coefficient updating method according to claim 8, wherein the calculating of the second distorter coefficient according to the first reference signal and the signal before decision, or according to the first reference signal, the signal after decision, and the signal before decision includes:
    calculating a second reference signal according to the first reference signal, or according to the first reference signal and the signal after decision; and
    calculating the second distorter coefficient according to the second reference signal and the signal before decision.

12. The distorter coefficient updating method according to claim 11, wherein the calculating of the second reference signal according to the first reference signal and the signal after decision includes:
    removing a linear inter-symbol interference within the first reference signal according to the signal after decision to generate a first reference signal without linear inter-symbol interference; and
    performing power normalization on the first reference signal without linear inter-symbol interference to generate a second reference signal.

13. The distorter coefficient updating method according to claim 11, wherein the calculating the second reference signal according to the first reference signal includes:
    performing power normalization on the first reference signal to generate the second reference signal.

14. The distorter coefficient updating method according to claim 11, wherein the calculating of the second distorter coefficient according to the second reference signal and the signal before decision includes:
    using a gradient descent method or a least square method according to the second reference signal and the signal before decision to calculate the second distorter coefficient.

15. The distorter coefficient updating method according to claim 8, wherein the non-linear predistorter performs a non-linear predistortion processing on a sequence of symbols input to the non-linear predistorter.

16. The distorter coefficient updating method according to claim 15, wherein a sampling rate of the non-linear predistorter is 1 sampling point per symbol.

17. A digital predistortion apparatus, comprising:
    a non-linear predistorter in an optical transmitter, configured to perform real-time predistortion processing on a signal input to the non-linear predistorter according to a predistortion coefficient;
    a decider in an optical receiver, configured to decide an input signal before decision to generate a signal after decision; and
    a distorter coefficient updating apparatus at an optical receiver side, the distorter coefficient updating apparatus comprising a processor configured to:
    perform non-linear re-distortion processing on the signal after decision according to a first distorter coefficient to generate a first reference signal; and
    calculate a second distorter coefficient according to the first reference signal and the signal before decision, or according to the first reference signal, the signal after decision, and the signal before decision, and
    wherein the second distorter coefficient is fed back to the processor as the first distorter coefficient of the processor in a next update, and the second distorter coefficient is fed back to the non-linear predistorter as a predistortion coefficient for the non-linear predistorter to perform a non-linear predistortion processing on the signal input to the non-linear predistorter,
    wherein the first distorter coefficient adopted by the processor is a same coefficient as the predistortion coefficient adopted by the non-linear predistorter.

* * * * *